United States Patent [19]

Feener, III

[11] Patent Number: 5,120,017
[45] Date of Patent: Jun. 9, 1992

[54] VEHICLE SEAT ADAPTER

[76] Inventor: Harold D. Feener, III, 704 Lupine La., Tallahassee, Fla. 32308

[21] Appl. No.: 563,397

[22] Filed: Aug. 6, 1990

[51] Int. Cl.⁵ ............................................. F16M 13/00
[52] U.S. Cl. ................................. 248/688; 248/188.8; 297/130
[58] Field of Search ............ 248/688, 503.1, 510, 248/188.8, 503, 677, 681, 346, 188.9; 206/320, 477, 487; 297/130

[56] References Cited

U.S. PATENT DOCUMENTS

| 4,368,867 | 1/1983 | Pendleton et al. | 248/346 |
| 4,394,563 | 7/1983 | Schnell | 248/188.8 X |
| 4,735,310 | 4/1988 | Lemery | 248/680 X |
| 4,738,425 | 4/1988 | Foster | 248/346 |
| 4,759,580 | 7/1988 | Berklich, Jr. et al. | 248/503.1 X |
| 4,865,377 | 9/1989 | Musser et al. | 248/503.1 X |

FOREIGN PATENT DOCUMENTS 200727  3/1955  Australia .......................... 297/130

*Primary Examiner*—David L. Talbott
*Attorney, Agent, or Firm*—Stephen T. Belsheim

[57] ABSTRACT

A device for adapting a detachably mounted vehicle seat for direct use when not attached to the vehicle. The device includes a base member which engages the brackets of the detached vehicle seat to thereby provide support for the vehicle seat.

10 Claims, 2 Drawing Sheets

VEHICLE SEAT ADAPTER

BACKGROUND OF THE INVENTION

The present invention relates to a device for adapting a detachably mounted vehicle seat for use other than as a vehicle seat. More particularly, the invention relates to a device for adapting a detachably mounted vehicle seat for use as a conventional seat.

In the past, many types of detachably mounted vehicle seats been available. U.S. Pat. No. 4,495,887 issued Jan. 29, 1985, to Mondrush shows such a seat. The Mondrush patent shows four mounting brackets, corresponding generally to the four corners of the seat, at the base of the seat for securing the seat to the floor of a vehicle. One places the mounting brackets through slots in the floor of the vehicle. Each mounting bracket engages a corresponding pin in each slot to secure the vehicle seat to the vehicle floor.

U.S. Pat. No. 4,805,952 issued Feb. 21, 1989, to Coleman shows another type of vehicle seat. The Coleman patent shows a tube plate which attaches to the base of the vehicle seat and a corresponding floor plate which attaches to the floor of the vehicle. The Coleman patent further shows a latching means for securing the tube plate to the floor plate.

U S. Pat. No. 4,660,795 issued Apr. 28, 1987, to Ikegaya et al. shows yet another type of detachably mounted Vehicle seat. The mounting device of the Ikegaya et al. patent is a seat slide device. The seat slide device basically consists of two C-shaped or channel shaped rails attached to the bottom of the vehicle seat. Corresponding rails are attached to the floor of the vehicle. The upper rail slidably engages the lower rail.

Furthermore, devices are available for adapting vehicle seats of a certain construction to different types of vehicles with different mounting points provided on the vehicle floor. U.S. Pat. No. 4,220,308 issued Sep. 2, 1982, Strien et al. shows such a device. The embodiment shown in the Strien et al. patent is of a design to adapt vehicle seats having slide rails.

Detachable vehicle seats are typically used in vans and recreation vehicles (R.V.'s), however, they are also used in passenger vehicles. Detachable vehicle seats have the advantage that they ma be removed from the vehicle and thereby provide greater versatility. The advantages of detachable vehicle seats include providing maximum cargo space in the vehicle and providing for easy cleaning of the vehicle and the seats.

The benefits associated with detachable vehicle seats have been limited to those associated with the vehicle and the ability to remove from the vehicle. Applicant is not aware of any one who has made direct use of the detached seats as functional seats. Therefore, it is desirable to provide a device for adapting vehicle seats for direct use when detached from the vehicle.

Heretofore, one drawback with the direct use of a detached vehicle seat is that the base of the seat may suffer damage if used on a surface other than the specially adapted floor of the vehicle. If the base of the vehicle seat suffers damage it may not properly fit with the floor adapter, and thereby render the seat unusable for its primary purpose. Therefore, it is desirable to provide a device for adapting a detachable vehicle seat for use when detached from the vehicle which protects the base of the seat and supports the seat in a stable condition. The vehicle owner can then remove the vehicle seats, for example when additional cargo space is needed, and can store the seats without fear that the base or the upholstery will be damaged.

It is also desirable to provide a device for adapting detachably mounted vehicle seats for use as conventional seats. Typically, a van owner, when attending a picnic or other outdoor event, will bring portable chairs for use at such site. These chairs are typically of a folding type and are stored in the vehicle. By providing an adapter device, the vehicle owner can use the detachably mounted seats of the vehicle as possible chairs thereby eliminating the necessity of transporting additional chairs.

SUMMARY OF THE INVENTION

The present invention aims generally to provide a device for adapting vehicle seats for use other than as a vehicle seat and provides one embodiment for adapting one type of vehicle seat.

One object of the present invention is to provide a device for adapting a detachably mounted vehicle seat for use as a conventional seat.

Another object of the present invention is to provide a portable seat which utilizes a detachably mounted vehicle seat.

Another object of the present invention is to provide a device for protecting the base of a vehicle seat when the seat is detached from the vehicle.

In one form thereof, the invention comprises a device for adapting a detachably mounted vehicle seat comprising a base member having a means for securing the seat to the base.

In another form thereof, the invention comprises an adapter for a detachably mounted vehicle seat comprising a base member for supporting the seat when detached from the vehicle. The base member has a means therein for securely fastening the seat to the base member.

In another form thereof, the invention comprises a portable seat comprising a detachably mounted vehicle seat and a base member. The vehicle seat has a means for mounting it to the floor of the vehicle. The base member has a means, corresponding to the mounting means on the vehicle seat, for securing the seat to the base.

DESCRIPTION OF A SPECIFIC EMBODIMENT

Figure 1:
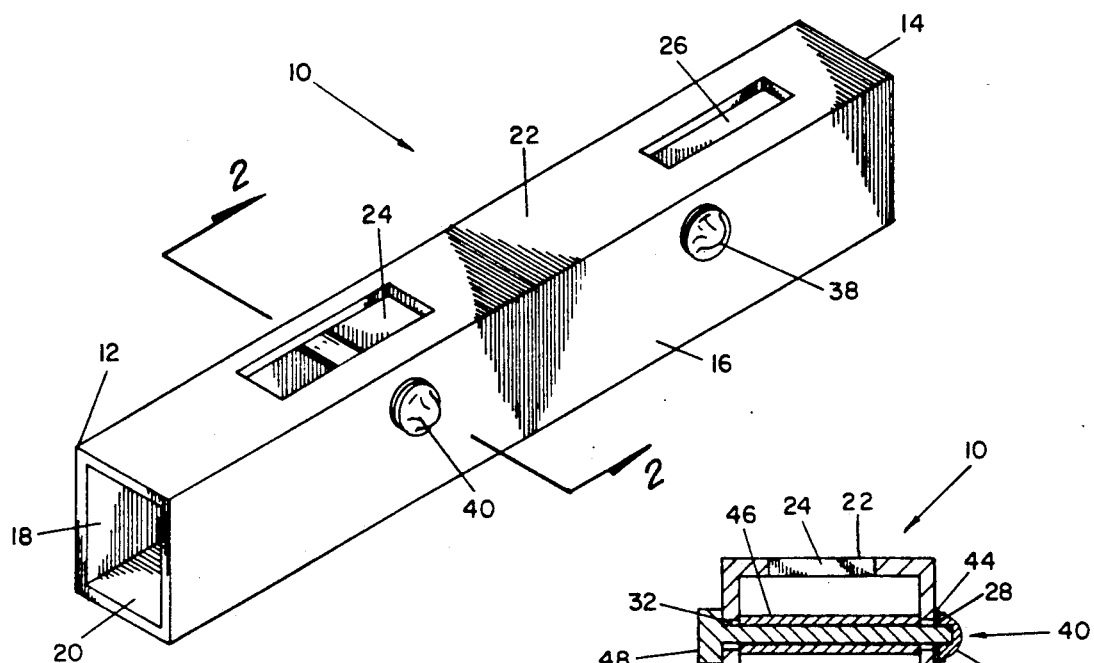
FIG. 1 is a perspective view of one section of the vehicle seat adapter.

FIG. 1 shows one section of the base, generally indicated as 10. Base 10 consists of two generally rectangularly-shaped tubular support members. Each support member has opposite ends 12, 14, opposite side walls 16, 18, a bottom wall 20, and a top wall 22. Base 10 can be made of aluminum or another material sufficient to form a strong, durable support member. The length of each section of base 10 is of a sufficient length to provide support for seat 50 so that seat 50 will remain stable and will not tip. The specific length of base 10 will vary depending on the specific application.

Openings 24, 26 in top wall 22 provide an inlet for attaching the brackets 54, 56 of seat 50 to base 10. The position of openings 24, 26 correspond to the placement of brackets 54, 56 on chair 50. Openings 24, 26 are of sufficient size so that brackets 54, 56 are easily inserted and removed from the volume of base 10.

Figure 2:
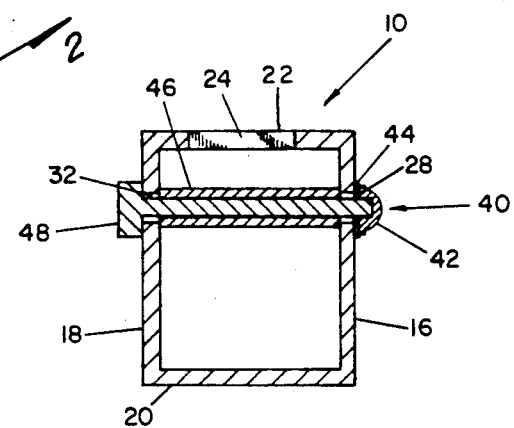
FIG. 2 is a sectional view along section line 2—2 of FIG. 1 showing an aperture and a bolt of the vehicle seat adapter.
Figure 3:
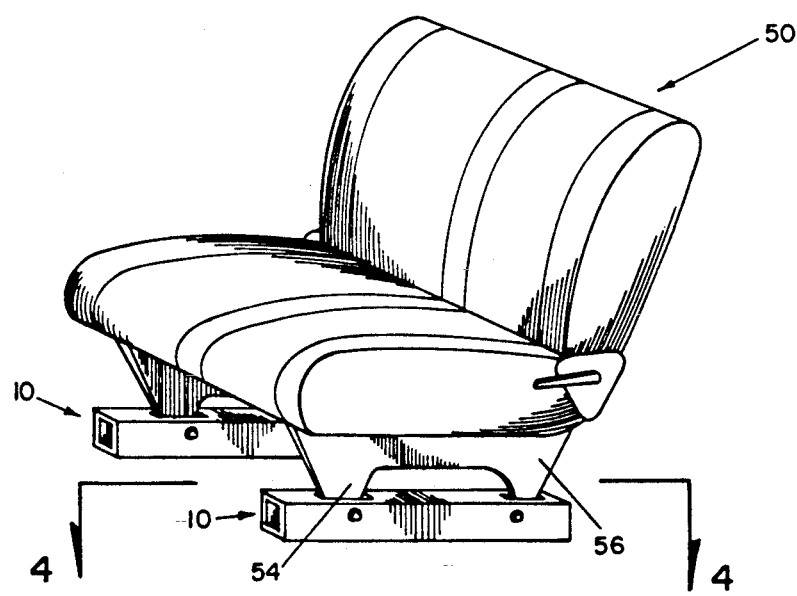
FIG. 3 is a perspective view of a vehicle seat attached to the vehicle seat adapter.

Sidewall 16 contains two apertures. One aperture 28 is shown in cross-section by FIG. 2. In FIG. 1, bolts 38, 40 are positioned through said apertures and are therefore not shown. Sidewall 18 contains two apertures corresponding to the apertures in sidewall 16. One corresponding aperture 32 is shown in FIG. 2. The apertures can be of any shape and generally correspond to the shape of bolts 38, 40.

Bolts, generally designated 38 and 40, pass through each set of corresponding apertures. FIG. 2 shows base 10 with bolt 40 through aperture 28 and corresponding aperture 32. Corresponding apertures 28, 32 are proximate to opening 24. The other set of corresponding apertures are proximate to opening 26. Furthermore, the respective corresponding apertures are intermediate top wall 22 and bottom wall 20. The position of the apertures is such that when bolts 38, 40 pass through their respective corresponding apertures and brackets 54, 56 pass through openings 24, 26, brackets 54, 56 engage bolts 38, 40.

Figure 4:
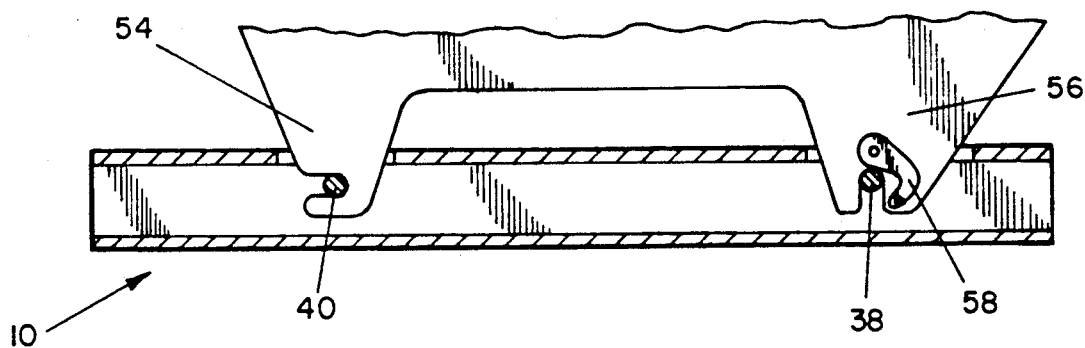
FIG. 4 is a sectional view along section line 4—4 of FIG. 3 showing the brackets of the vehicle seat engaging the bolts of the vehicle sea adapter.

As mentioned above, brackets 54, 56 engage to bolts 38, 40. Brackets 54, 56 can be of any number of designs so as to engage bolts 38, 40. FIG. 4, shows brackets 54, 56 connected to base 10.

Bracket 54 has a C-shaped notch which engages bolt 40. Bracket 56 has a downwardly facing U-shaped notch which engages bolt 38. A lever 58 pivotally attaches to bracket 56. Lever 58 has a C-shaped notch or other means for engaging bolt 38 and keeping bracket 56 in secure attachment to bolt 38.

In operation, bracket 54 passes through slot 24 so as to engage bolt 40 with the C-shaped notch. Then bracket 56 passes through slot 26 so as to engage bolt 38 with its U-shaped notch. The C-shaped lever 58 engages bolt 38 to secure bracket 56 to base 10. When bracket 56 is securely engaged, vertical and horizontal movement of bracket 56 is prevented and thereby vertical and horizontal movement of bracket 54 is also prevented. In this way the seat 50 is securely mounted to base 10.

When brackets 54, 56 are engagably connected to base 10, the bottom ends of brackets 54, 56 will not be in contact with bottom wall 20 bolts 38, 40 will carry the weight of seat 50. In order to protect the threads of bolts 38, 40 from wear due to force exerted on said bolts by the weight of seat 50, bolts 38, 40 are provided with sleeves 46 which encompass bolts 38, 40.

As shown in FIG. 2, sleeve 46 encompasses bolt 40. At the location where bolt 40 protrudes through aperture 28, an acorn nut 42 is attached to bolt 40 and is adjacent said wall 16. Located intermediate side wall 16 and acorn nut 42 is washer 44. At the distal end of bolt 40 at the location where bolt 40 protrudes through sidewall 18, a nut 48 is attached to bolt 40 and is adjacent sidewall 18.

In the same manner, bolt 38 is provided with a similar sleeve, acorn nut, washer, and nut. As can be appreciated, bolt 40 can be reversed so that acorn nut 42 is located adjacent sidewall 18 and nut 48 is located adjacent sidewall 16.

It will be understood that the invention herein can be modified and adapted to be used with any type of detachably mounted seat. Such changes are within the scope of this invention.

What is claimed is:

1. A device for adapting a vehicle seat having at least one bracket, wherein the bracket detachably mounts the seat to a vehicle floor whereby the seat is in a first useful condition when mounted to the vehicle floor, the device comprising:
   an elongate base member having a top wall containing an opening therein, and a pin affixed to the base member so as to be near the opening; and
   when the seat is detached from the vehicle floor and in a second useful condition the bracket passes through the opening and engages the pin so that the base member supports the vehicle seat so as to not damage the bracket.

2. An adapter for use in conjunction with a detachably mounted vehicle seat which is in a first useful condition when attached to the vehicle, said adapter comprising:
   a base member adapted for supporting said vehicle seat when in a second useful condition, which is when the seat is detached from said vehicle;
   a latching means having reciprocal mating parts, one mating part attached to said base member and another mating part attached to the vehicle seat and adapted for mounting the vehicle seat to the floor of the vehicle; and
   said base member supporting the vehicle seat so as to not damage the mating part attached to the vehicle seat when the vehicle seat is in the second condition.

3. The adapter of claim 2 wherein said base member comprise an elongate member.

4. The adapter of claim 2 wherein:
   said mating part attached to the vehicle seat comprises a bracket; and
   said base member comprises a tube having top, side, and bottom walls and defining a volume, said tube having an opening in said top wall adapted for receiving said bracket and said mating part attached to the base being positioned within the volume of the tube.

5. The adapter of claim 2 wherein the one mating part attached to the base member is a pin.

6. The adapter of claim 2 wherein the other mating part attached to the vehicle seat is a bracket.

7. A portable seat assembly comprising:
   a detachably mounted vehicle seat having at least one bracket by which said seat detachably mounts to a vehicle floor so that the vehicle seat is in a first useful condition when mounted to the vehicle floor;
   a base member that supports the vehicle seat when the vehicle seat is in a second useful condition when detached from the vehicle floor, and a mating part attached to said base member; and
   when the vehicle seat is in the second useful condition the bracket engages the mating part so that the base member supports the vehicle seat so as to not damage the bracket.

8. The portable seat of claim 7 wherein said base member comprises an elongate member.

9. The portable seat assembly of claim 7 wherein the vehicle seat has opposite sides, a pair of spaced apart brackets depend from each of said sides of the vehicle seat; and a pair of the base members wherein each base member contains a pair of spaced apart openings corresponding to one pair of brackets, and each one of said openings having one of said mating part near thereto so that when the vehicle seat is in the second useful condition each bracket passes through its corresponding opening and engages the corresponding mating part.

10. The portable seat assembly of claim 7 wherein said mating part is a pin.

* * * * *